US009348070B2

(12) United States Patent
Lister et al.

(10) Patent No.: US 9,348,070 B2
(45) Date of Patent: May 24, 2016

(54) SECURITY DEVICES

(75) Inventors: Adam Lister, Andover (GB); James Peter Snelling, Andover (GB)

(73) Assignee: De La Rue International Limited, Basingstoke, Hampshire (GB)

( * ) Notice: Subject to any disclaimer, the term of this patent is extended or adjusted under 35 U.S.C. 154(b) by 63 days.

(21) Appl. No.: 14/236,206

(22) PCT Filed: Jul. 30, 2012

(86) PCT No.: PCT/GB2012/051844
§ 371 (c)(1),
(2), (4) Date: Apr. 14, 2014

(87) PCT Pub. No.: WO2013/017865
PCT Pub. Date: Feb. 7, 2013

(65) Prior Publication Data
US 2014/0226212 A1   Aug. 14, 2014

(30) Foreign Application Priority Data
Aug. 2, 2011   (GB) .................................. 1113323.8

(51) Int. Cl.
*G02B 27/10*   (2006.01)
*G03B 21/60*   (2014.01)
(Continued)

(52) U.S. Cl.
CPC ................. *G02B 5/26* (2013.01); *B41M 3/148* (2013.01); *B42D 25/29* (2014.10); *B42D 25/355* (2014.10);
(Continued)

(58) Field of Classification Search
CPC .... G02B 27/145; G02B 3/0056; G02B 21/56; G02B 21/602; G02B 21/625; B42D 15/10; B29L 2011/0016; B29L 11/0073

USPC ................. 359/618–621, 626, 443, 454–455; 235/487; 457/162, 164, 165, 226, 227, 457/553–555; 264/1.1, 1.32, 2.7
See application file for complete search history.

(56) References Cited

U.S. PATENT DOCUMENTS 4,691,993 A   9/1987   Porter et al.
5,080,463 A   1/1992   Faykish et al.
(Continued)

FOREIGN PATENT DOCUMENTS

EP   1498545 A1   1/2005
EP   2329962 A1   6/2011
(Continued)

OTHER PUBLICATIONS

Great Britain Search Report dated Nov. 30, 2011 for Great Britain application No. GB1113323.8.
(Continued)

*Primary Examiner* — Dawayne A Pinkney
(74) *Attorney, Agent, or Firm* — Ohlandt, Greeley, Ruggiero & Perle, L.L.P.

(57) ABSTRACT

The present invention relates to improvements in security devices that can be used in various authenticating or security applications, and in particular to an optically variable security device which can be viewed under low light conditions. The security device comprises a light deflection structure having a first side and a second opposing side. A colorshifting layer is applied to the first side of the light deflection structure and a reflection layer is applied to at least a first region of the second side of the light deflection structure so as to provide a strong reflection in a direction substantially parallel to the incident light source when the direction of the incident light is at an angle away from the normal to the security device. The security device has at least one second region in which the reflection layer is absent, said first and second regions defining indicia.

22 Claims, 6 Drawing Sheets

(51) Int. Cl.
  G02B 5/26    (2006.01)
  B41M 3/14    (2006.01)
  D21H 21/42   (2006.01)
  G02B 5/04    (2006.01)
  B42D 25/29   (2014.01)
  B42D 25/355  (2014.01)
  B42D 25/328  (2014.01)

(52) U.S. Cl.
  CPC ............... *D21H 21/42* (2013.01); *G02B 5/045* (2013.01); *B42D 25/328* (2014.10); *B42D 2033/10* (2013.01)

(56) References Cited

U.S. PATENT DOCUMENTS

| | | | |
|---|---|---|---|
| 6,500,526 | B1 | 12/2002 | Hannington |
| 2008/0224462 | A1 | 9/2008 | Dubner |
| 2010/0060987 | A1* | 3/2010 | Witzman ............... G02B 5/286 359/589 |
| 2010/0270379 | A1* | 10/2010 | Lister et al. .................... 235/487 |
| 2011/0027538 | A1* | 2/2011 | Hoffmann et al. ............ 428/173 |

FOREIGN PATENT DOCUMENTS

| | | |
|---|---|---|
| GB | 2245219 A | 2/1992 |
| JP | 2005242157 A | 9/2005 |
| WO | 03070483 A1 | 8/2003 |
| WO | 2011031501 A2 | 3/2011 |

OTHER PUBLICATIONS

International Search Report dated Dec. 3, 2012 for PCT application No. PCT/GB2012/051844.
Written Opinion dated Dec. 3, 2012 for PCT application No. PCT/GB2012/051844.

* cited by examiner

SECURITY DEVICES

The present invention relates to improvements in security devices that can be used in various authenticating or security applications, and in particular to an optically variable security device which can be viewed under low light conditions.

It is generally known to include security devices in the form of elongate elements in paper or other substrates, as a security feature. Such elements can be threads, strips or ribbons of, for example, plastics film, metal foil, metallised plastic, metal wire. These elongate elements are included in the thickness of the substrate to render imitation of documents produced therefrom more difficult. These elements help in the verification of the documents, as they render the view of the documents in reflected light different from that in transmitted light. To increase the security provided by the inclusion of such an elongate element, it is also known to endow the element itself with one or more verifiable properties over and above its presence or absence. Such additional properties include magnetic properties, electrical conductivities, the ability to absorb x-rays, fluorescence, optically variable effects and thermochromic behaviour.

As a further security feature, it has been found to be particularly advantageous to provide windows in one side of the surface of the substrate, which expose such elongate elements at spaced locations. Examples of methods of manufacturing paper incorporating security elements with or without windows are described below. It should be noted that references to "windowed thread paper" include windowed paper incorporating any elongate security element.

EP-A-0059056 describes a method of manufacture of windowed thread paper on a cylinder mould paper-making machine. The technique involves embossing the cylinder mould cover to form raised regions and bringing an impermeable elongate security element into contact with the raised regions of the mould cover, prior to the contact entry point into a vat of aqueous paper stock. Where the impermeable security element makes intimate contact with the raised regions of the embossing, no fibre deposition can occur and windows are formed in the surface of the paper. After the paper is fully formed and couched from the cylinder mould cover, water is extracted from the wet fibre mat and the paper is passed through a drying process. In the finished paper the regions of the security element which are exposed in the windows are visible in reflected light on one side of the paper, which is commonly used for mainly banknotes.

The widespread use of security documents having security elements exposed on windows along the length of the element has resulted in enhanced security. A security document of this type provides this enhancement as, when viewed in transmitted light, the security element provides a different view from that which is seen under reflected light, where parts of the security element are readily visible in the window. However, there is a continual need for further enhanced security features to render the task of a would-be counterfeiter more difficult.

A significant development is described in EP-A-0319157 which describes the incorporation in security paper of a security thread which has a recognisable pattern, design or indicia provided by partially demetallising a metallised carrier substrate. The metal free portions are preferably letters which are clearly visible when the security paper is viewed in transmitted light as strong highlights against a much darker metal background. The indicia can advantageously be legends or numerals relating to the security document itself, e.g. currency value of a banknote. Such indicia are known as "negative indicia", as opposed to "positive indicia" in which the indicia comprise the metal regions.

A further development is described in GB-A-2323814 whereby a security element has a reflective metal layer in the form of a design which consists of at least one repeating geometric pattern of which the frequency, instantaneous amplitude or maximum amplitude of the pattern varies along the length of the element. Such complex fine line patterns are extremely difficult for counterfeiters to generate by the commonly used technique of foil blocking. Additionally it has been found that designs are more easily recognised on a narrow thread than alphanumeric characters which become less legible as they get smaller.

It is also well known in the prior art to use liquid crystal materials, thin film interference structures, multilayer polymeric structures and photonic crystal structures to generate angularly dependent coloured reflection. Examples of security devices utilising thin film interference structures are described in U.S. Pat. No. 4,186,943 and US-A-20050029800 and examples of security devices utilising multilayer polymeric structures are described in EP-A-1047549.

Security devices based on the optical principle of retroreflection have been developed. Further information can be found in Optical Document Security, 2nd Edition, edited by Rudolph L. van Renesse. One application of retroreflective devices has been as overlays on secure documents, such as passports or ID cards. The retroreflectors typically comprise a monolayer of glass beads and a high refractive index coating on the backside of the beads to create a partially reflecting mirror. With the correct lighting arrangement the retroreflection of the overlay film completely saturates the underlying image that is normally visible. Images can be incorporated into the retroreflective film by the use of locally applied coatings that reduce the level of retroreflection.

The use of security devices relying on the use of reflected light is limited in low lighting conditions. The object of the current invention is firstly to improve the visibility of reflective security features in poor lighting condition and secondly to use this enhancement in poor lighting conditions to provide further improved security threads exhibiting angularly dependent coloured reflection.

The invention therefore provides a security device comprising a light deflection structure having a first side and a second opposing side, a colourshifting layer applied to the first side of the light deflection structure and a reflection layer applied to at least a first region of the second side of the light deflection structure so as to provide a strong reflection in a direction substantially parallel to the incident light source when the direction of the incident light is at an angle away from the normal to the security device, the security device having at least one second region in which the reflection layer is absent, said first and second regions defining indicia.

The invention further provides a security document made from the aforesaid security substrate.

A preferred embodiment of the present invention will now be described, by way of example only, with reference to the accompanying drawings, in which:—

Figure 1:
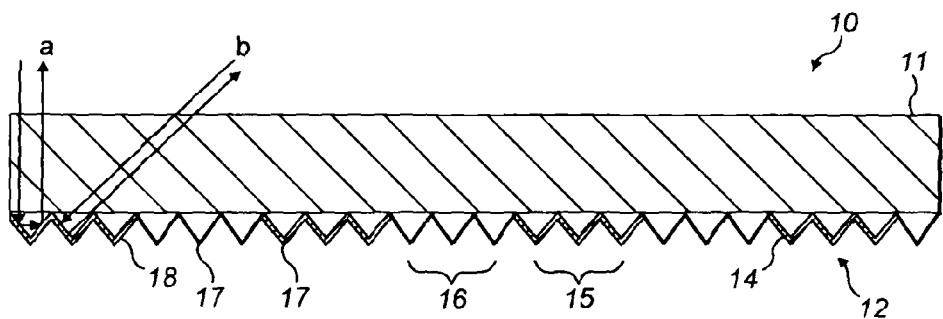
FIG. 1 is a cross sectional side elevation of a section of a security device according to the present invention.

FIG. 1 illustrates a first embodiment of the security device 10 of the present invention. The device 10 comprises a carrier substrate 11. This substrate 11 is preferably a translucent or transparent polymeric film such as polyethylene (PET) or biaxially oriented polypropylene (BOPP). A light deflection structure 12 is applied to the substrate 11, either as a separate layer or formed in a surface of the substrate 11. The light deflection structure 12 is one that has facets or lenses which, when provided with a reflective coating 14 strongly reflects light substantially back to the light source when the light source is substantially parallel to the normal of the substrate and when the light source is away from the normal to the security device 10.

Figure 7:
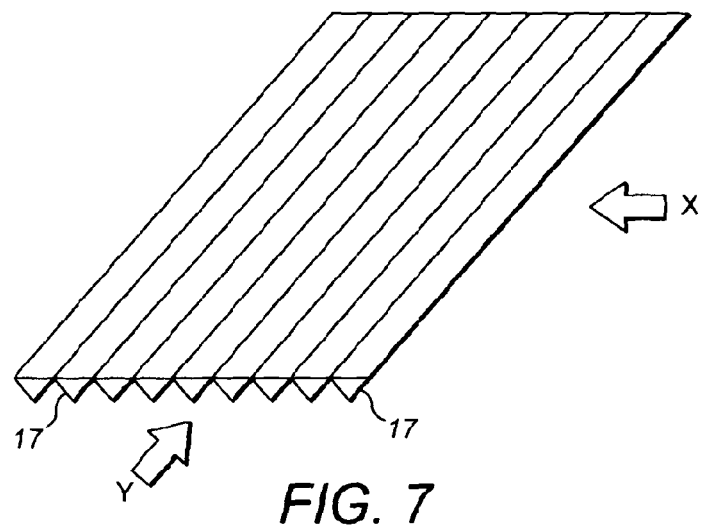
FIG. 7 is a schematic representation illustrating a light deflection structure in the form of an array of parallel linear prisms.

One form of suitable light reflection structure 12 is shown in FIGS. 1 and 7 which comprises a prismatic structure comprising a series of adjacent parallel linear prisms 17 with planar facets arranged to form a grooved surface. These can be formed by either thermally embossing the prisms into the substrate 11 or by casting the prisms into a resin which is curable by ultra-violet light or e-beam irradiation.

Figure 8:
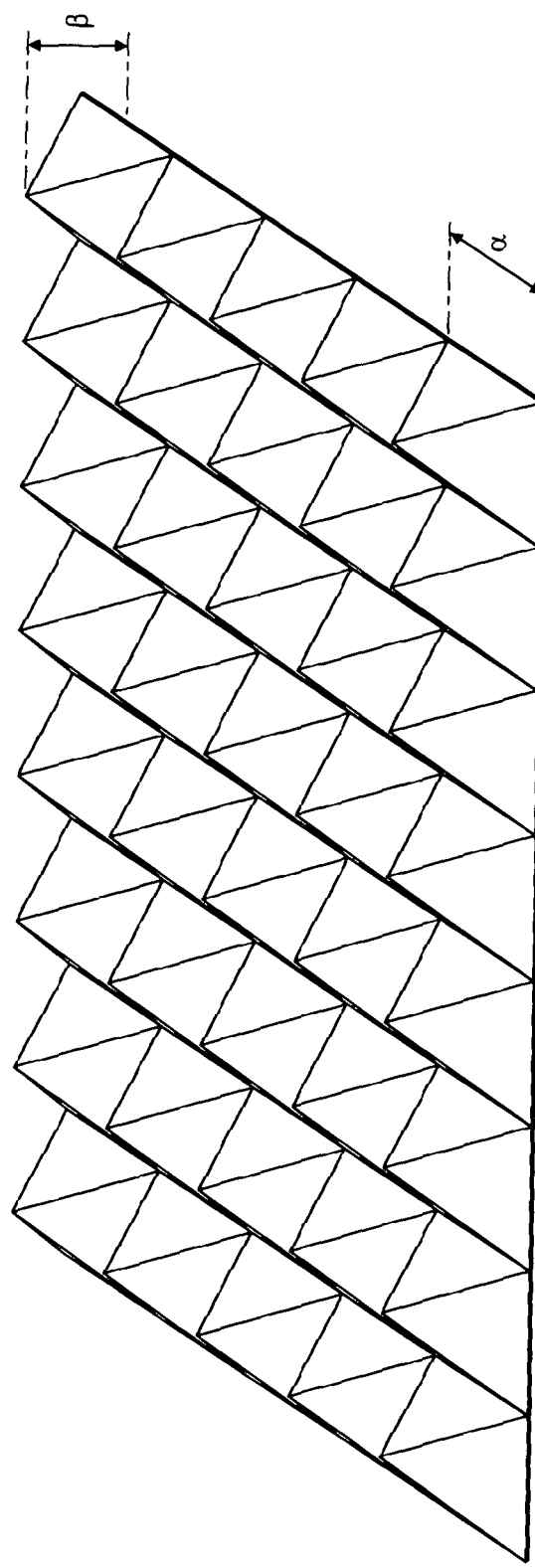
FIG. 8 is a schematic representation illustrating a light deflection structure in the form of an array of square pyramids.

Examples of other suitable light deflection structures 12 include, but are not limited to, a ruled array of tetrahedra, an array of square pyramids (as shown in FIG. 8), an array of corner-cube structures, an array of hexagonal-faced corner-cubes and a saw-tooth prismatic array. Other structures may also be used, such as Fresnel lenses and lenticular lenses.

The light deflection structure 12 is then provided with either positive or negative indicia 13 by coating or covering selected regions 15 of the light deflection structure 12 with a highly reflective layer 14, whilst leaving other regions 16 uncoated or uncovered. Examples of a suitable highly reflective material for use in providing the layer 14 include vapour deposited metallic coatings (such as vapour deposited aluminium), metal or metallic-like inks, vapour deposited high refractive index (hri) dielectric materials (for example ZnS), vapour deposited thin film interference structures or other reflective optically variable materials or structures.

The indicia 13 may thus be formed by using a mask during the vapour deposition process, by direct printing with metallic inks or by fully metallising and then demetallising. The demetallisation process is achieved using a known method, such as the direct etch technique or the resist and etch technique.

FIG. 1 illustrates the light path when the security device 10 is viewed in reflected light. In this example the reflective layer 14 is a vapour deposited layer of aluminium. In this example the light deflection structure is a one-dimensional microprismatic structure, such as an array of linear microprisms 17. In this case the operation of the security device 10 is dependent on the angle between the viewing direction and the long axis of the linear microprisms 17 i.e. the observed optical effect is anisotropic. The optical effect associated with the present invention is seen most readily when the light source is parallel with the direction perpendicular to the long axes of the linear microprisms 17 (direction X in FIG. 7). When the direction of the light source is parallel to the long axes of the linear microprisms the optical effect is not readily apparent (direction Y in FIG. 7).

When the security device 10 is viewed off-axis, such that the viewing angle is perpendicular to one of the facets 18 (condition (b)) and a light source is positioned substantially parallel with the viewing direction and parallel with the direction perpendicular to the long axes of the linear microprisms 17, the reflective (coated) regions 15 appear very bright even in poor lighting conditions. Bright reflection can also occur when the security device 10 is viewed at normal incidence to the carrier substrate 11 and a light source is positioned substantially parallel with the viewing direction, (condition (a)) as the light strikes one facet 18, is reflected to the opposing facet 18 and reflected a second time at substantially the same angle as it entered the substrate 11, slightly shifted in the transverse direction.

Therefore in the present invention the security device 10 is optimised to exhibit maximum brightness at two viewing positions in both cases where there is a light source substantially parallel to the viewing direction. On tilting the device 10 two peaks of maximum brightness are observed for the reflective regions 15 at viewing condition (a) and viewing condition (b). In practical applications the security device 10 will typically be viewed in a room with multiple light sources, such as an array of fluorescent lights and in this scenario it is easy to obtain the condition where a light source is parallel in both viewing conditions (a) and (b).

The effect has been tested on arrays of parallel linear microprisms 17 in which the facets 18 makes an angle of approximately 45° with the surface of the substrate 11 and the angle between adjacent facets 18 is approximately 90°. Arrays with various pitch lengths (8, 16, 25 and 32 μm) have been assessed and there appears to be no significant difference in the effect seen. The pitch of the microprism array is preferably in the range 1-100 microns, and more preferably 5-40 microns, and the height of the microprisms 17 is preferably in the range 1-100 microns, and more preferably 5-40 microns.

In a further embodiment the size and geometry of the light deflection structures 12 can be varied across the device 10 to create additional optical variation. For example for a parallel array of linear prisms 17 the angle the facets 18 make with the surface of the carrier substrate 11 can be varied in different regions of the security device 10 such that the angle away from the normal to the substrate at which viewing condition (b) occurs will vary across the security device 10. The use of such a variation is applicable to all embodiments of the invention.

Figure 2:
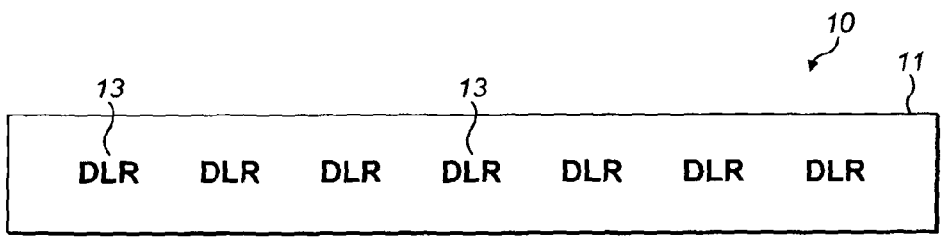
FIG. 2 is a plan view of another embodiment of a security device according to the present invention.

A typical example of a security device 10 is shown in FIG. 2 where positive indicia 13 provide identifying information, in this case the term "DLR".

In another embodiment of the invention the light deflection structure 12 is patterned with a reflective coating and is combined with a colourshifting layer. Any type of transparent or semi-transparent colourshifting materials may be used for this including, inter alia, thin film interference structures, multilayer polymeric structures, photonic crystal structures and cholesteric liquid crystal structures.

When light strikes the colourshifting layer, some of the light is reflected. The wavelength of the reflected light depends on the structure and composition of the colourshift material and the reflected light will appear coloured. The wavelength of the reflected light is also dependent on the angle of incidence, which results in a colour change perceived by the viewer as the colourshift layer is tilted.

Figure 3:
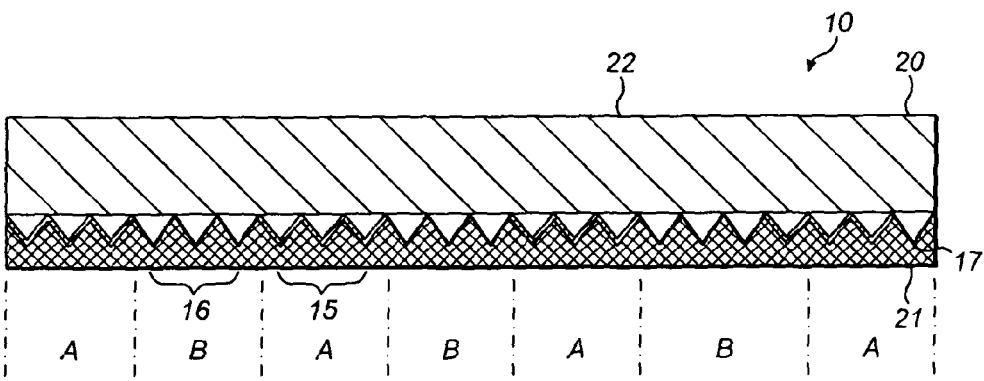
FIG. 3 is a cross sectional side elevation of yet another embodiment of a security device according to the present invention.
Figure 4:
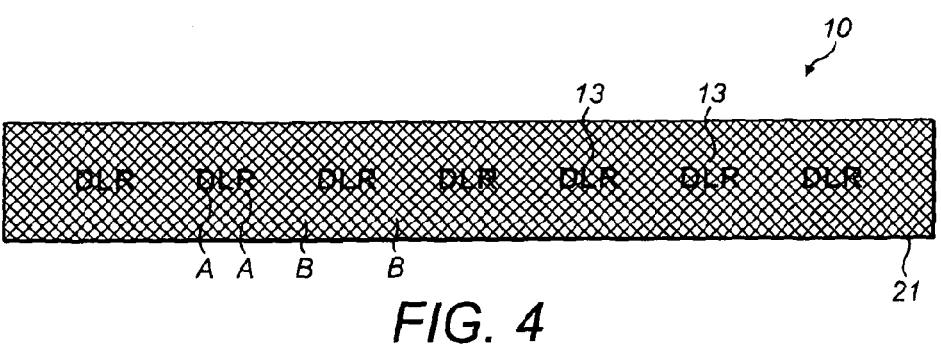
FIG. 4 is a plan view of a further embodiment of a security device according to the present invention.

FIGS. 3 and 4 show examples of this embodiment of the invention. The colourshifting layer 20 is preferably a multi-layer polymer colourshifting film which shows a reflective colourshift. Such films are described in EP-A-1047549, U.S. Pat. No. 5,089,318 and WO-A-9619347 and are formed of multiple layers (hundreds or thousands) of at least two different materials. The various layers may have different actual and/or optical thickness and different indices of refraction. As incident white light strikes the film, light of a specific wavelength is reflected whilst other wavelengths are transmitted through the layers to be reflected at different angles to the normal. Thus when viewed at different angles different colours can be seen. In one example the multilayer film is a multilayer polymeric film of alternating layers of polyester and polymethlymethacrylate, and is selected to have approximately 140 to 150 layers, each layer having a thickness of approximately 0.1 microns, resulting in a total film thickness of approximately 15 microns. In this example the film exhibits a green colour when viewed along normal incidence against a dark absorbing background and shifts to blue as the viewing direction is changed away from normal incidence.

The light deflection structure 12, which is an array of linear microprisms 17 as illustrated in FIG. 1, is applied to the colourshifting layer 20, which can be done by one of the methods described in relation to FIG. 1. In the finished security device 10 the colourshifting layer 20 is above the light deflection structure 12 such that the observer of the security device 10 views the light deflection structure 12 through the colourshifting layer (N.B. this is applicable to all embodiments of the invention with a colourshifting layer 20). Indicia 13 created by reflective regions 15, in this example positive indicia, are formed on the light deflection structure 12 using a similar method as described previously. It is preferable that the light deflection structure 12 is located between the colourshifting layer 20 and the reflective regions 15. (again this applies to all embodiments with a colourshifting layer 20).

A dark absorbing layer 21 is then applied, preferably uniformly, over the back of the light deflection structure 12 as shown in FIG. 3. The security device 10 exhibits different optical effects in regions A, i.e. the reflective indicia 13, and in regions B, i.e. the non-reflective regions 16.

The optical effects in regions A and B will now be described when the security device 10 is viewed through the top surface 22 of the colourshifting layer 20. Against the dark background provided by the dark absorbing layer 21, only the reflective effect of the colourshifting layer 20 is observed, since little light is being transmitted from behind. If the dark background was not present and the device 10 viewed in transmission, the intensity of the transmitted colour would saturate the reflective colour.

The transmitted and reflected colours are complementary, for example, a green reflected colour produces a magenta transmitted colour. In regions A the presence of the reflective regions 15 would result in the light that is transmitted through the colourshifting layer 20 being reflected back to the observer in the manner described for FIG. 1. Therefore when the security device 10 is viewed at normal incidence and a light source is positioned substantially parallel with the viewing direction the light reflected back by light deflection structure 12 is the transmitted light of the colourshifting layer 20, which in this example is magenta which is the complementary colour of the green reflected light.

In comparison in region B the light transmitted through the colourshifting layer 20 is absorbed by the absorbing layer 21 applied to the light deflection structure 12 and the light reflected back to the observer is predominantly the reflected light from the colourshifting layer 20. In this example at normal incidence the colourshifting layer 20 selectively reflects green light and therefore region B appears green.

As the security device 10 is tilted away from normal incidence such that the viewing angle is perpendicular to the facet 18 and a light source is positioned substantially parallel with the viewing direction and parallel with the direction perpendicular to the long axes of the linear microprisms 17 (condition (b) in FIG. 1)) the reflective regions 15 in regions A appear very bright even in poor lighting conditions. The light reflected back by the light deflection structure 12 is now the transmitted light of the colourshifting layer 20 for the off-axis viewing condition, which in this example is yellow which is the complementary colour of the blue reflected light. The non-reflective regions 16 in regions B will exhibit the reflective off-axis colour of the colourshifting layer 20, which in this case is blue.

A plan view of a typical security device 10 having this structure is shown in FIG. 4. In this case the positive metallised indicia 13 form the characters "DLR" (regions A) and the non-metallised background forms regions B. When viewing at normal incidence "DLR" appears magenta against a green background and when viewing off-axis the "DLR" characters have a strongly reflecting bright appearance appearing yellow in colour in contrast to the duller background which appears blue. The security device 10 exhibits two different colourshifting regions A, B but in addition the presence of the light deflection structure 12 enhances the contrast between the two regions A, B and provides a striking unexpected increase in brightness for one of the regions in the off-axis viewing condition.

Figure 5:
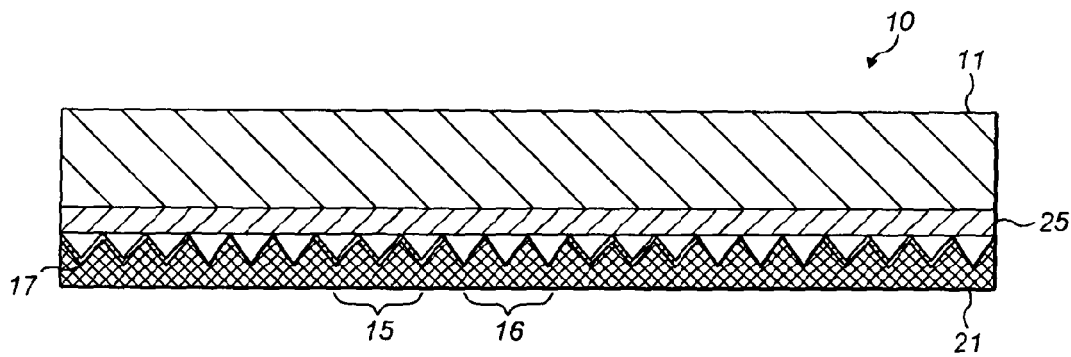
FIGS. 5 and 6 are cross sectional side elevations of further alternative embodiments of a security device according to the present invention.

FIG. 5 shows a similar embodiment of the invention in which a liquid crystal film 25 is used instead of a multilayer polymer colourshifting film 20. In this case the liquid crystal film 25 requires a substantially transparent carrier substrate 11. This would typically be a polymeric film for example made from polypropylene or polyethyleneterephlate.

Figure 6:
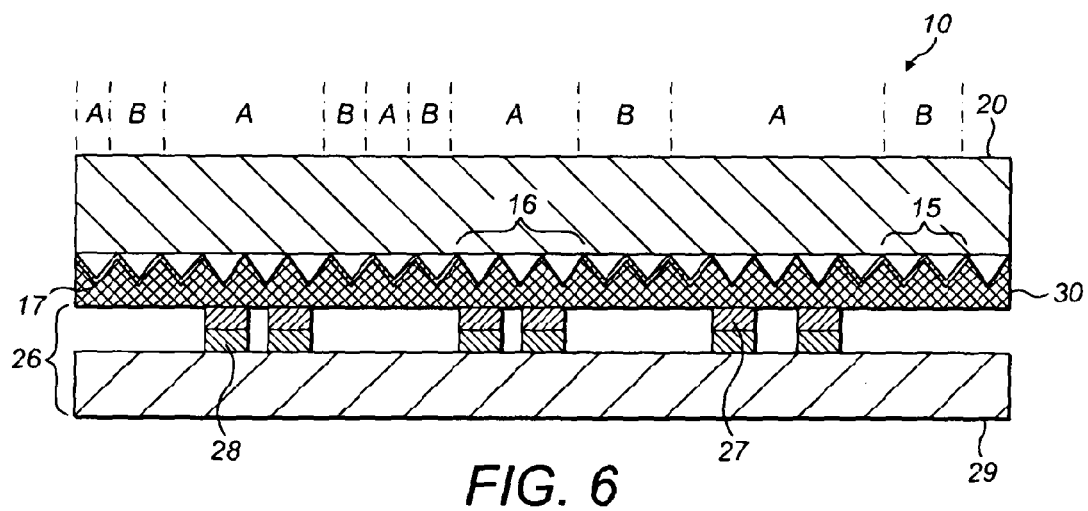

FIG. 6 shows a further example where the structure in FIG. 3 is laminated, with a layer of adhesive 30, to a conventional patterned demetallised film 26, comprising a carrier layer 29, a partially metallised layer 28 with resist 27 overlying the remaining metal 28. In this example the dark absorbing resist 27 is used to create demetallised indicia. In region B the regions of black resist 27 appear as described in relation to FIG. 3 but the demetallised indicia are not perceptible in reflected light as there are no reflective facets 18 to direct the light transmitted through the colourshifting layer 20 back to the observer. In transmitted light the demetallised characters are clearly visible against a uniform dark background and appear in the colour of the transmitted light of the colourshifting layer 20. Therefore, if using the colourshifting layer 20 of the FIG. 3 example, the indicia would appear magenta when viewed at normal incidence and switch to yellow when viewed off-axis.

To further improve the security and aesthetics of the security device 10 the light deflection structure 12 can be applied in a partial manner to form indicia 13 such as a pattern, identifying information in the form of a symbol, picture or alphanumeric characters. In one example the light deflection structure 12 could be applied in the same area as the coated reflective layer 14.

Figure 9A:
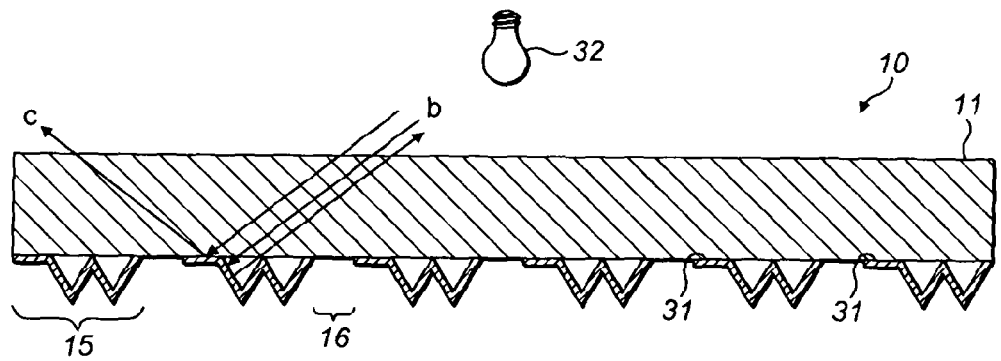
FIG. 9a is a cross sectional side elevation of a yet another embodiment of a security device according to the present invention.

In a further example, illustrated in FIG. 9, the coated reflective layer 14 is provided both over regions of the light deflection structure 12 and in additional planar regions 31 of the carrier substrate 11 which are not provided with the light deflection structure 12. When the security device 10 is viewed at normal incidence to the carrier substrate 11 and a light source 32 is positioned substantially parallel with the viewing direction, (condition (a) in FIG. 1) both the light deflecting structures 12 coated with the reflective layer 14 and the planar regions 31 coated with the reflective layer 14 will reflect the light to a similar degree and the indicia 13 created by these two regions 12,31 will appear the same. In contrast, when the security device 10 is viewed off-axis, such that the viewing angle is perpendicular to one of the facets 18 (condition (b)) and a light source is positioned substantially parallel with the viewing direction and parallel with the direction perpendicular to the long axes of the linear microprisms 17, the reflective light deflection structure 12 will appear very bright even in poor lighting conditions as described previously for FIG. 1, while the reflective planar regions 31 will not be readily apparent as the angle of reflection from the planar surface will direct the light away from the viewing direction as shown in FIG. 9.

Figure 9B:
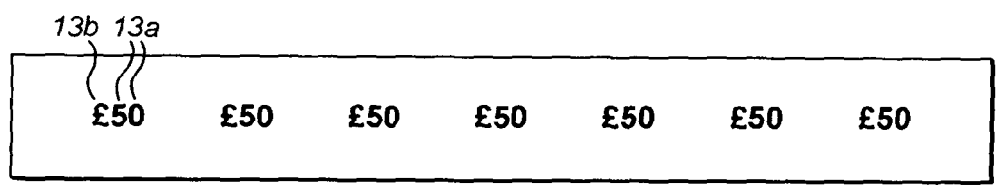
FIGS. 9b and 9c are plan views of the security device of FIG. 9a under different viewing conditions.
Figure 9C:
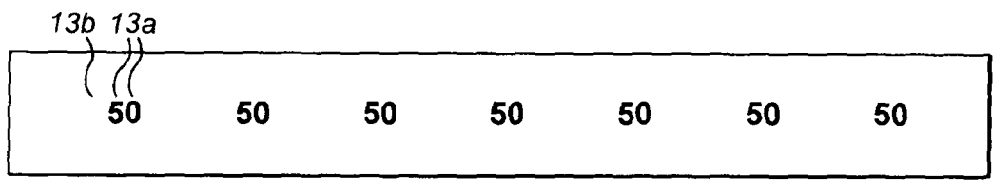

A typical embodiment of such a security device 10 is shown in FIGS. 9b and 9c. In this example the indicia 13a formed from the light deflection structures 12 coated with the reflective layer 14 is the numeral "50" and the indicia 13b formed from the planar regions 31 coated with the reflective layer 14 is "£". For viewing condition (a) the two sets of indicia 13a, 13b will appear substantially the same to show the complete information "£50" but when the device is tilted to meet viewing condition (b) only the indicia 13a formed from the light deflecting structures coated with the reflective layer will be readily apparent, and indicia 13b (i.e. the "£" symbol) will substantially disappear.

Figure 10:
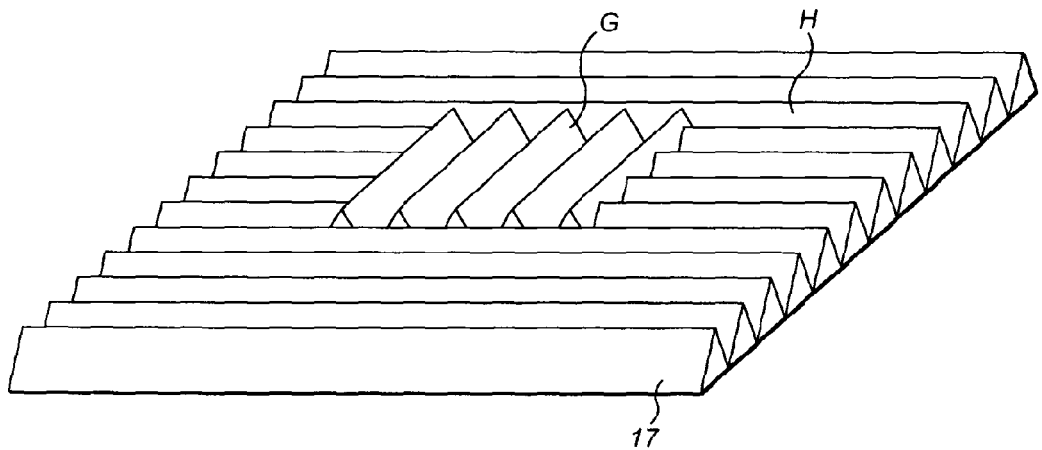
FIG. 10 is a schematic representation illustrating a light deflection structure in the form of two arrays of parallel linear prisms in different orientations.
Figure 11:
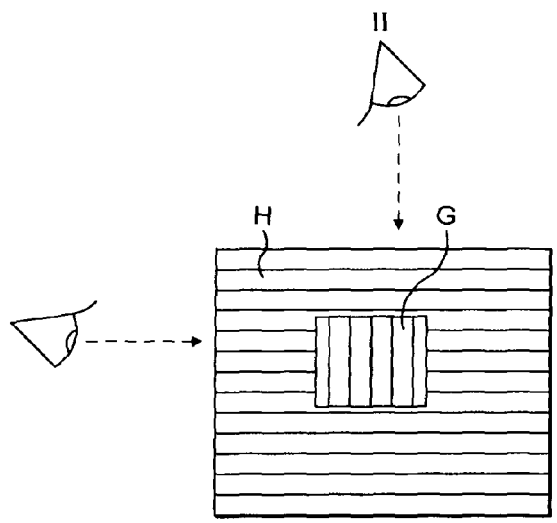
FIG. 11 is a plan view of the light deflection structure of FIG. 10.

In a further embodiment the security device 10 comprises arrays of linear microprisms 17 in different orientations, as shown in FIG. 10, where the arrays are in two orthogonal orientations. FIG. 11 shows two linear microprism arrays in which their long axes are oriented at 90° to each other. This provides a security device 10 with two distinguishable regions G, H. If the two regions G, H are provided with positive indicia 13 by coating the light deflection structure 12 with a reflective layer 14 then when the security device 10 is viewed at normal incidence to the carrier substrate 11 and a light source is positioned substantially parallel with the viewing direction, (condition (a) in FIG. 1) the positive indicia in both regions G and H will be visible. In contrast, when the security device 10 is viewed off-axis, such that the viewing angle is perpendicular to one of the facets 18 (condition (b)) the visibility of the indicia 13 will depend on the orientation of the viewing direction with respect to the long axis of the linear microprism arrays in regions G and H. When a light source is positioned substantially parallel with the viewing direction and parallel with the direction perpendicular to the long axes of the linear microprisms 17 in region H (viewing direction II in FIG. 11) the reflective light deflection structures 12 defining the indicia in region H will appear very bright and the indicia in region G will not be readily apparent. In contrast when the security device 10 is rotated such that a light source is positioned substantially parallel with the viewing direction and parallel with the direction perpendicular to the long axes of the linear microprisms in region G (direction I in FIG. 11) the reflective light deflection structure 12 defining the indicia in region H will appear very bright and the indicia in region G will not be readily apparent.

It is not necessary for the invention that the arrays of the 1D-microprisms, as shown in FIG. 11, are in two orthogonal orientations and any degree of rotation can be selected depending on the optical effect desired.

To gain more isotropy in the optical properties of the security device, a light deflecting structure can be selected which has optical properties which are not rotationally dependent. Such light deflecting structures may, for example, have two-dimensional microprismatic structures such as square pyramids (as shown in FIG. 8) and corner-cubes.

Figure 12:
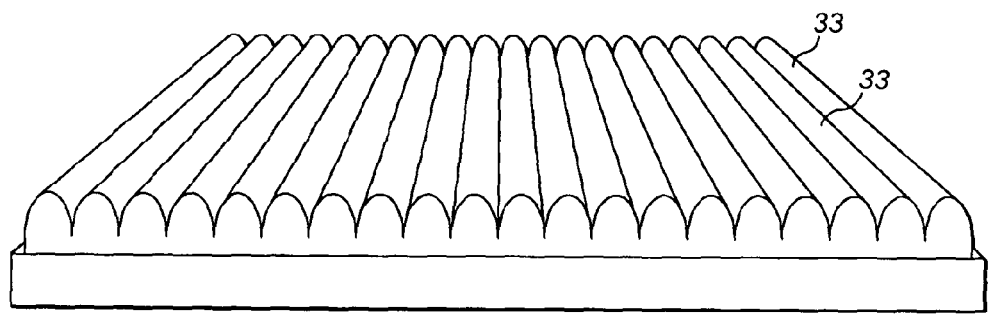
FIG. 12 is a schematic representation illustrating a light deflection structure in the form of an array of lenticules.

In FIG. 12 a light deflecting structure 12 is illustrated which has a structure which is similar to a microprismatic structure, but instead of microprisms 17 comprises an array of lenticules 33 with a domed surface structure.

Figure 13:
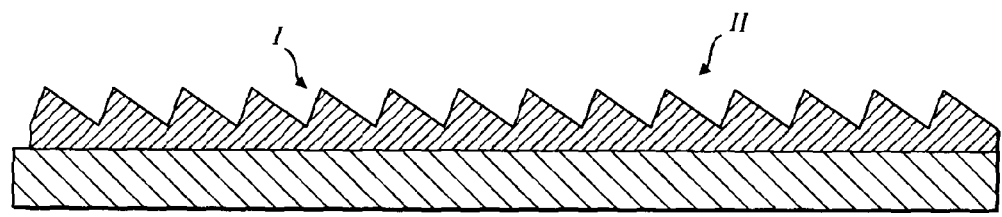
FIG. 13 is a schematic representation illustrating a light deflection structure in the form of an array of saw teeth.

In FIG. 13 a light deflecting structure 12 is used which has a saw-tooth type structure. This type of structure provides a further variability in the optical properties of the security device as the angle away from the normal to the substrate at which the strong reflection condition occurs will be different for light incident on facet I compared to facet II.

The security device 10 can be incorporated in security substrates used to make secure documents in any of the conventional formats known in the prior art, for example as patches, foils, stripes, strips or threads. The security device 10 can be arranged either wholly on the surface of the base substrate, as in the case of a stripe or patch, or can be visible only partly on the surface of the substrate in the form of a windowed security thread. Security threads are now present in many of the world's currencies as well as vouchers, passports, travellers' cheques and other documents. In many cases the thread is provided in a partially embedded or windowed fashion where the thread appears to weave in and out of the paper and is visible in windows in one or both surfaces of the base substrate. One method for producing paper with so-called windowed threads can be found in EP-A-0059056. EP-A-0860298 and WO-A-03095188 describe different approaches for the embedding of wider partially exposed threads into a paper substrate. Wide threads, typically having a width of 2-6 mm, are particularly useful as the additional exposed thread surface area allows for better use of optically variable devices, such as that used in the present invention.

The security device 10 may be subsequently incorporated into a paper or polymer base substrate so that it is viewable from both sides of the finished security substrate. Methods of incorporating security elements in such a manner are described in EP-A-1141480 and WO-A-03054297. In the method described in EP-A-1141480, one side of the security element is wholly exposed at one surface of the substrate in which it is partially embedded, and partially exposed in windows at the other surface of the substrate.

Base substrates suitable for making security substrates for security documents may be formed from any conventional materials, including paper and polymer. Techniques are known in the art for forming substantially transparent regions in each of these types of substrate. For example, WO-A-8300659 describes a polymer banknote formed from a transparent substrate comprising an opacifying coating on both sides of the substrate. The opacifying coating is omitted in localised regions on both sides of the substrate to form a transparent region. WO-A-0039391 describes a method of making a transparent region in a paper substrate. Other methods for forming transparent regions in paper substrates are described in EP-A-723501, EP-A-724519, WO-A-03054297 and EP-A-1398174.

The security device 10 may also be applied to one side of a paper substrate so that portions are located in an aperture formed in the paper substrate. An example of a method of producing such an aperture can be found in WO-A-03054297. An alternative method of incorporating a security element which is visible in apertures in one side of a paper substrate and wholly exposed on the other side of the paper substrate can be found in WO-A-2000/39391.

It will be further understood by those skilled in the art that the substrate of the present invention may be used in combination with existing approaches for the manufacture of security elements. Examples of suitable constructions that can be used include, but are not limited to, those described in WO-A-03061980, EP-A-0516790, WO-A-9825236, and WO-A-9928852.

The security device 10 may also be combined with a machine readable feature, such as a magnetic ink, and in particular a transparent magnetic ink such as those described in GB-A-2387812 and GB-A-2387813. Alternatively a machine readable aspect may be provided by the introduction of separate machine-readable layers. In addition to magnetic materials detectable materials that react to an external stimulus include but are not limited to fluorescent, phosphorescent, infrared absorbing, thermochromic, photochromic, electrochromic, conductive and piezochromic materials. The security device 10 can be used in banknotes as well as other security documents such as vouchers, passports, travellers' cheques and other documents.

The invention claimed is:

1. A security device comprising:
a carrier substrate having a first surface;
a light deflection structure applied to at least a part of the first surface of the carrier substrate, the light deflection structure having a first side and a second opposing side;
a colorshifting layer applied to the first side of the light deflection structure; and
a reflection layer applied to at least a first region of the second side of the light deflection structure so as to provide a strong reflection in a direction substantially parallel to an incident light source when a direction of incident light of the incident light source is at an angle away from the normal to the security device,
wherein the security device has at least one second region in which the reflection layer is absent, said first and second regions defining indicia.

2. The security device as claimed in claim 1, wherein the colorshifting layer is applied to the carrier substrate.

3. The security device as claimed in claim 1, wherein the carrier substrate is the colorshifting layer.

4. The security device as claimed in claim 1, wherein the light deflection structure covers the first surface of the carrier substrate.

5. The security device as claimed in claim 1, wherein the light deflection structure is partially applied to the first surface of the carrier substrate leaving one or more regions of the carrier substrate uncovered by the light deflection structure and at least one of said one or more regions of the carrier substrate that is uncovered by the light deflection structure being covered by the reflection layer.

6. The security device as claimed in claim 1, wherein the carrier substrate is translucent or transparent.

7. The security device as claimed in claim 1, wherein the reflection layer comprises a metallic coating applied to the first region of the light deflection structure.

8. The security device as claimed in claim 1, wherein the reflection layer comprises an optically variable reflective material or structure applied to the first region of the light deflection structure.

9. The security device as claimed in claim 1, wherein the first region strongly reflects light when the incident light source is substantially parallel to the normal of the substrate.

10. The security device as claimed in claim 1, wherein the light deflection structure comprises a prismatic structure, Fresnel lens or a lenticular structure.

11. The security device as claimed in claim 10, wherein the light deflection structure comprises the prismatic structure with a pitch of the prisms in the range of 1 to 100 microns.

12. The security device as claimed in claim 10, wherein the light deflection structure comprises the prismatic structure in which the height of the prisms is in the range of 1 to 100 microns.

13. The security device as claimed in claim 1, wherein the light deflection structure has a size and geometry that varies across the security device.

14. The security device as claimed in claim 1, wherein the light deflection structure comprises a prismatic structure comprising at least two orthogonal arrays of prisms, and wherein the at least two orthogonal arrays of prisms lie in different orientations.

15. The security device as claimed in claim 1, wherein the colorshifting layer is located on the light deflection structure.

16. The security device as claimed in claim 1, wherein the colorshifting layer is a multilayer polymer film or a liquid crystal film.

17. The security device as claimed in claim 1, further comprising a light absorbing layer applied to the light deflection structure.

18. The security device as claimed in claim 1, further comprising a demetallised film applied to an opposing side of the carrier substrate to which the colorshifting layer is applied.

19. A security substrate comprising a base substrate and the security device as claimed in claim 1.

20. The security substrate as claimed in claim 19, wherein the security device is applied to a surface of the base substrate.

21. The security substrate as claimed in claim 20, wherein the security device is at least partially embedded in the base substrate and visible in windows in at least one surface of the base substrate.

22. The security document formed from the secure substrate as claimed in claim 19, comprising a voucher, passport, banknote, cheque, certificate or other document of value.

* * * * *